United States Patent
Wu (10) Patent No.: US 7,450,185 B2
(45) Date of Patent: Nov. 11, 2008

(54) FULLY INTEGRATED TUNER CIRCUIT ARCHITECTURE FOR A TELEVISION SYSTEM

(75) Inventor: Szu-Hsien Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 543 days.

(21) Appl. No.: 10/974,840

(22) Filed: Oct. 28, 2004

(65) Prior Publication Data

US 2006/0092334 A1 May 4, 2006

(51) Int. Cl.
*H04N 5/50* (2006.01)

(52) U.S. Cl. .............. 348/725; 348/726; 455/314; 455/189.1

(58) Field of Classification Search .......... 348/734, 348/725, 726, 731, 732, 733; 455/260, 314, 455/318, 323, 255, 189.1, 190.1
See application file for complete search history.

(56) References Cited

U.S. PATENT DOCUMENTS

| | | | |
|---|---|---|---|
| 6,177,964 B1 | 1/2001 | Birleson et al. | |
| 6,282,413 B1 * | 8/2001 | Baltus | 455/260 |
| 6,377,315 B1 | 4/2002 | Carr et al. | |
| 6,417,737 B1 * | 7/2002 | Moloudi et al. | 330/301 |
| 7,251,298 B1 * | 7/2007 | Hietala et al. | 375/340 |
| 2004/0125240 A1 * | 7/2004 | Stikvoort et al. | 348/731 |

* cited by examiner

*Primary Examiner*—M. Lee
(74) *Attorney, Agent, or Firm*—Finnegan, Henderson, Farabow, Garrett & Dunner LLP

(57) ABSTRACT

A television tuner system includes a low noise amplifier (LNA) for receiving and amplifying television signals, a quadrature mixer coupled to receive the amplified television signals and generate first intermediate frequency (IF1) quadrature signals, a complex mixer coupled to receive the IF1 quadrature signals and generate second intermediate frequency (IF2) quadrature signals, a polyphase filter coupled to receive the IF2 quadrature signals and generate IF2 real signals, a channel select filter (CSF) coupled to receive the IF2 real signals and select signals within a desired channel, and an IF variable-gain amplifier (VGA) for amplifying the signals within the desired channel selected by the CSF.

53 Claims, 8 Drawing Sheets

FULLY INTEGRATED TUNER CIRCUIT ARCHITECTURE FOR A TELEVISION SYSTEM

FIELD OF THE INVENTION

This invention relates in general to tuners suitable for use in television systems and, more particularly, to a television tuner with a circuit architecture that may be fully integrated.

BACKGROUND OF THE INVENTION

In a television system, tuners are generally used to extract signals within a desired channel having a channel width of 6 MHz out of a broad television spectrum having a range of approximately 54~860 MHz (cable systems) or 54~806 MHz (broadcast systems in the U.S.). Tuners generally also convert the extracted signals into a standard intermediate frequency (IF) so that subsequent devices in the television system may process the signals at such standard IF. In general applications in the U.S., the standard IF is 45.75 MHz.

Conventional tuners generally convert the signals within the desired channel to the standard IF by mixing the signals with a local oscillation (LO) signal using a mixer. A mixer mixing an input signal with an LO signal would generate two output signals, one at a sum (sum frequency) of the frequencies of the input signal and the LO signal and one at a difference (difference frequency) between the frequencies of the input signal and the LO signal. Typically, signals at the difference frequency will be selected, while signals at the sum frequency will be filtered out. Therefore, if the frequency of the LO signal is apart from a frequency of the desired channel by an amount equal to the standard IF, a mixer mixing the LO signal with the desired channel would convert the signals in the desired channel into the standard IF. Thus, for example, if the desired channel is transmitted at 100 MHz, the LO signal may have a frequency of 145.75 MHz or 55.25 MHz. However, a mixer cannot differentiate a case where the frequency of the LO is higher than that of the desired channel from another case where the frequency of the LO is lower than that of the desired channel. In other words, in converting signals of the desired channel to the standard IF, a first signal at a frequency above and spaced apart from that of the LO signal by an amount equal to the standard IF would be converted to the standard IF as well as a second signal at a frequency below and spaced apart from that of the LO signal by an amount equal to the standard IF. For example, if the desired channel is at 100 MHz and the LO signal has a frequency of 145.75 MHz, a signal at 191.5 MHz would also be converted into 45.75 MHz and interfere with the signals in the desired channel. Such an interfering signal is generally referred to as an image signal and must be suppressed.

Conventional tuners are generally of one of two types, namely, a single-conversion tuner or a dual-conversion tuner. A single-conversion tuner utilizes a tracking filter to suppress image signals, while a dual-conversion tuner converts the television signals to a first intermediate frequency and then utilizes a filter with fixed parameters to suppress image signals. An example of each type is discussed below.

Figure 1A:
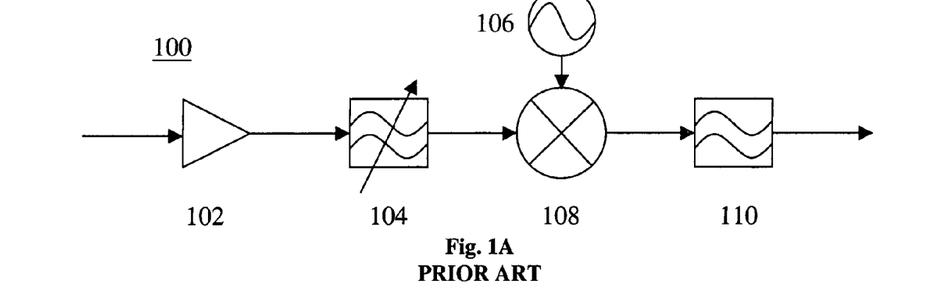
FIG. 1A shows the structure of a conventional tuner.

FIGS. 1A-1I illustrate aspects of a conventional single-conversion tuner 100, wherein FIG. 1A shows the structure of tuner 100. FIGS. 1B-1E illustrate frequency spectrums of the television signals at different stages of tuner 100 for a first example in which a low channel is to be selected. FIGS. 1F-1I illustrate frequency spectrums of the television signals at different stages of tuner 100 for a second example in which a high channel is to be selected.

Single-conversion tuner 100 receives television signals having a frequency spectrum ranging from a low frequency $f_L$ to a high frequency $f_H$ and selects a desired channel out of the television signals. As shown in FIG. 1A, tuner 100 includes a low-noise amplifier (LNA) 102 for receiving and amplifying the television signals, a tracking filter 104 for filtering out image signals of the desired channel, a local oscillator 106 providing an LO signal having a frequency $f_{LO}$ higher than the desired channel by an amount equal to the standard IF, a mixer 108 for mixing the television signals with the LO signal, and a channel select filter (CSF) 110 for selecting the desired channel of signals.

Figure 1B:
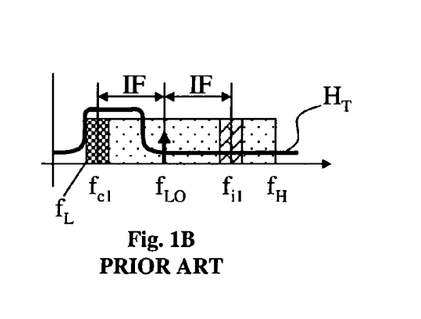
FIGS. 1B-1E illustrate frequency spectrums of television signals at different stages of the tuner of FIG. 1A for a first example in which a low channel is to be selected.

FIG. 1B shows a frequency spectrum of the television signals after being received and amplified by LNA 102. In the first example, a low channel within the frequency spectrum of the television signals, having a center frequency of $f_{c1}$ towards a lower end of the frequency spectrum, is to be selected. The frequency of the LO signal, $f_{LO}$, is indicated in FIG. 1B to be higher than $f_{c1}$ by an amount equal to the standard IF, or 45.75 MHz, which is labeled as "IF" in FIGS. 1B-1I. An image signal band (or image signal) is also shown in FIG. 1B to be above and spaced apart from $f_{LO}$ by an amount equal to IF. In FIG. 1B, the image signal band has a center frequency of $f_{i1}$, and $f_{i1}-f_{LO}=f_{LO}-f_{c1}=$IF. Also shown in FIG. 1B is a filter response of tracking filter 104, labeled as curve $H_T$. The image signal band falls outside a pass band of tracking filter 104. Therefore, the image signal band may be suppressed by passing the television signals through tracking filter 104.

Figure 1C:
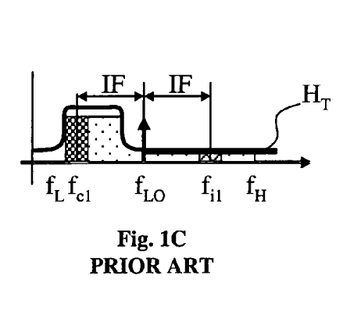

FIG. 1C shows a frequency spectrum of the television signals after being filtered by tracking filter 104. As shown in FIG. 1C, the portion of the spectrum within the pass band of tracking filter 104 is preserved, while the portion outside the pass band of tracking filter 104, including the image signal band, is substantially suppressed.

Figure 1D:
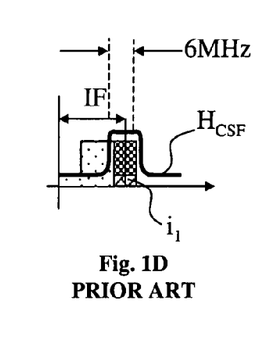
Figure 1E:
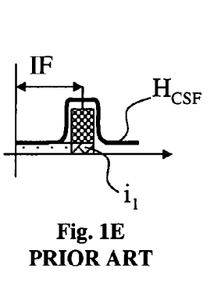

After being filtered by tracking filter 104, the television signals are mixed by mixer 108 with the LO signal provided by local oscillator 106. As a result, the television signals are converted to difference frequencies between the LO signal and the television signals, as shown in FIG. 1D. Also as shown in FIG. 1D, both remnants of the image signal and the signals within the desired channel are converted to the standard IF, and the portion of the spectrum denoted as $i_1$ corresponds to the remnants of the image signal. FIG. 1D further shows a filter response of CSF 110, labeled as curve $H_{CSF}$. The pass band of CSF 110 has a bandwidth of approximately 6 MHz and is centered at approximately 45.75 MHz. After the signals pass through CSF 110, the signals within the desired channel are selected, with the remnants of the image signal thereof substantially suppressed, as shown in FIG. 1E.

Figure 1F:
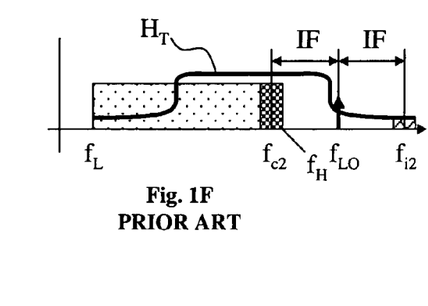
FIGS. 1F-1I illustrate frequency spectrums of television signals at different stages of the tuner of FIG. 1A for a second example in which a high channel is to be selected.
Figure 1G:
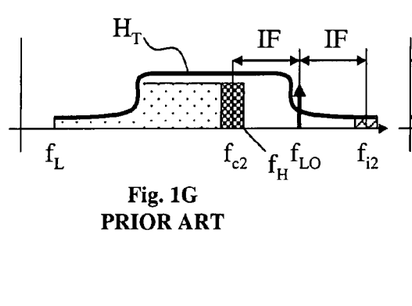
Figure 1H:
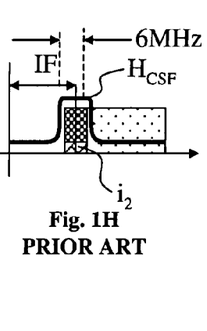
Figure 1I:
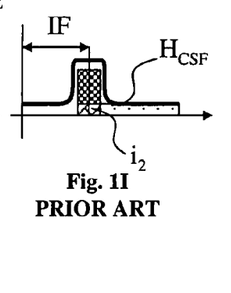

In the second example, a high channel within the frequency spectrum of the received television signals is to be selected. A filtering response of tracking filter 104 is accordingly adjusted such that the desired high channel falls within the pass band of tracking filter 104 while the image signal of the desired high channel is rejected as falling outside that pass band. FIG. 1F shows the frequency spectrum of the television signals after being received and amplified by LNA 102. In the amplified signals, a high channel having a center frequency of $f_{c2}$ lies within and towards a higher end of the frequency spectrum of the television spectrum. $f_{LO}$ is higher than $f_{c2}$ by an amount equal to the standard IF, or 45.75 MHz. An image signal band, or an image signal, has a center frequency $f_{i2}$ that is higher than $f_{LO}$ by 45.75 MHz. A filter response of tracking filter 104, labeled as curve $H_T$, is also shown in FIG. 1F. The image signal band falls outside a pass band of tracking filter 104, while the desired high channel falls within that pass band. FIGS. 1G-1I respectively illustrate the frequency spectrums of the signals as they pass through tracking filter 104, mixer 108, and CSF 110. These spectrums should be understood by one skilled in the art and are therefore not explained in detail herein.

As discussed above, when selecting different channels (a low channel and a high channel in the above examples), a filtering response of tracking filter 104 must be adjusted accordingly. Tracking filters as such are generally powered by a 30V source and are difficult to integrate.

To obviate the problems associated with a tracking filter, there have been provided dual-conversion tuners for use in television systems, an example of which is disclosed in U.S. Pat. No. 6,177,964 to Birleson et al., and is discussed below with reference to FIGS. 2A-2E.

Figure 2A:
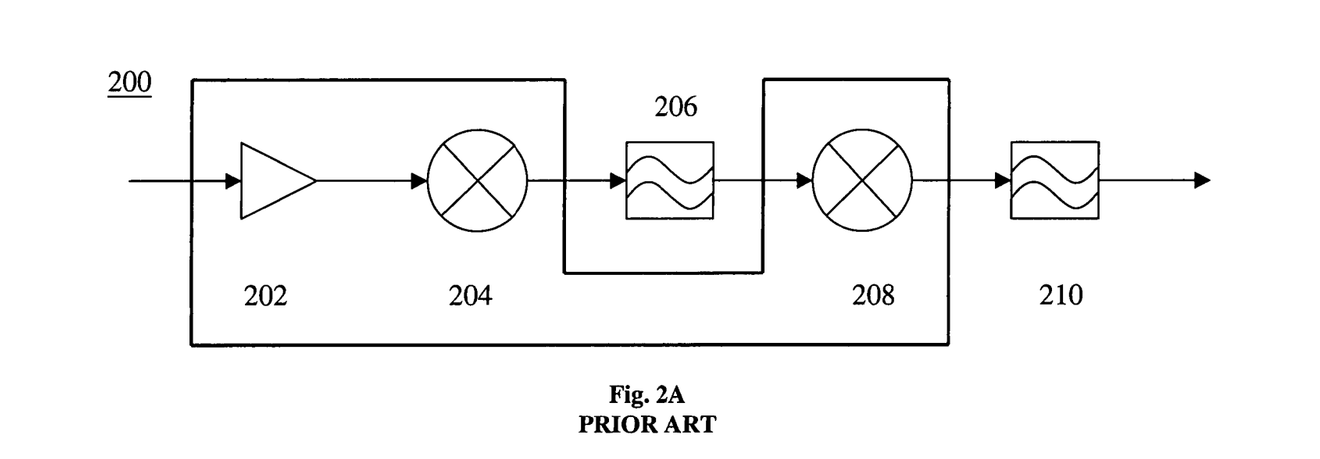
FIG. 2A shows a structure of a dual-conversion tuner.
Figure 2B:
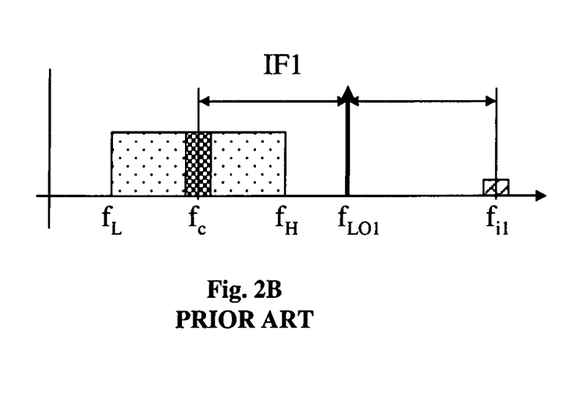
FIGS. 2B-2E illustrate frequency spectrums of television signals at different stages of the tuner of FIG. 2A.
Figure 2C:
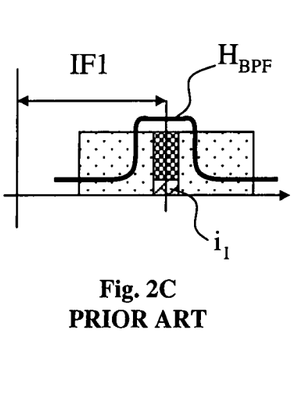
Figure 2D:
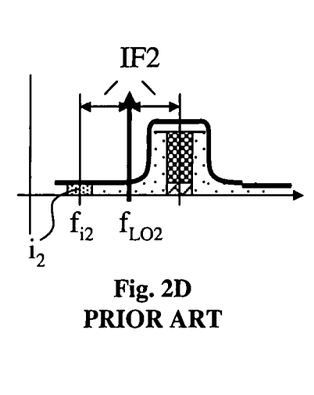
Figure 2E:
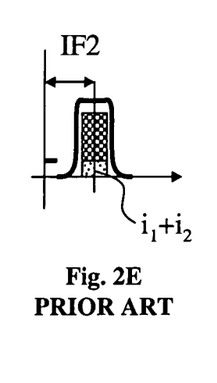

FIG. 2A shows a structure of a dual-conversion tuner 200 according to Birleson et al. Tuner 200 includes an LNA 202 for receiving and amplifying television signals, a first mixer 204 for mixing the amplified television signals with a first LO signal having a frequency $f_{LO1}$, a band pass filter (BPF) 206 for filtering the signal output of mixer 204, a second mixer 208 for mixing the output of BPF 206 with a second LO signal having a frequency $f_{LO2}$, and a CSF 210 for selecting a desired channel. FIG. 2B shows the frequency spectrum of the received television signals, including the desired channel, which has a center frequency $f_c$. $f_{LO1}$ is higher than $f_c$ by an amount equal to a first intermediate frequency IF1. IF1 may be selected such that $f_{LO1}$ is outside the frequency spectrum of the television signals, and preferably far away from the frequency spectrum. As a result, a corresponding first image signal $f_{i1}$ of the desired channel with respect to $f_{LO1}$ would also be far away from the frequency spectrum, and may be easily suppressed by a filter (not shown) prior to LNA 202. FIG. 2B shows the remnants of the first image signal $f_{i1}$ after being suppressed by the filter prior to LNA 202. FIG. 2C shows the frequency spectrum of the signal output of first mixer 204, wherein a portion of the spectrum corresponding to the desired channel lies at a frequency equal to IF1 and the portion of the spectrum denoted as $i_1$ corresponds to the remnants of the first image signal. A filtering response of BPF 206 is illustrated in FIG. 2C as curve $H_{BPF}$. FIG. 2D shows the frequency spectrum of the television signals after being filtered by BPF 206. The frequency of the second LO signal, $f_{LO2}$, is lower than IF1 by an amount equal to the standard intermediate frequency, denoted as IF2. A corresponding second image signal with respect to $f_{LO2}$ is at frequency $f_{i2}=f_{LO2}-IF2$, as indicated in FIG. 2D. Then, after second mixer 208 and CSF 210, the signals of the desired channel are filtered out, as shown in FIG. 2E, where the portion of the spectrum denoted as $i_1+i_2$ corresponds to the remnants of the first image signal and the second image signal.

Tuner 200 as shown in FIG. 2A does not require a tracking filter, and therefore does not require a 30V power supply. However, tuner 200 still requires two filters, BPF 206 and CSF 210, which may not be easily integrated with the rest of the circuit.

SUMMARY OF THE INVENTION

Consistent with the present invention, there is provided a television tuner system includes a low noise amplifier (LNA) for receiving and amplifying television signals, a quadrature mixer coupled to receive the amplified television signals and generate first intermediate frequency (IF1) quadrature signals, a complex mixer coupled to receive the IF1 quadrature signals and generate second intermediate frequency (IF2) quadrature signals, a polyphase filter coupled to receive the IF2 quadrature signals and generate IF2 real signals, a channel select filter (CSF) coupled to receive the IF2 real signals and select signals within a desired channel, and an IF variable-gain amplifier (VGA) for amplifying the signals within the desired channel selected by the CSF.

Consistent with the present invention, there is also provided a single-chip tuner suitable for use in a television system that includes a quadrature mixer connectable to a low-noise amplifier (LNA) for receiving television signals and connectable to a first local oscillator to receive first quadrature local oscillation (LO) signals, wherein the quadrature mixer generates first intermediate frequency (IF1) quadrature signals by mixing the television signals with the first quadrature LO signals; a dual quadrature mixer coupled to receive the IF1 quadrature signals and generate second intermediate frequency (IF2) quadrature signals; and a polyphase filter coupled to receiving the IF2 quadrature signals and generate IF2 real signals.

Consistent with the present invention, there is further provided a television tuner system that includes a low noise amplifier (LNA) for receiving and amplifying television signals and an integrated circuit provided on a substrate. The integrated circuit includes a quadrature mixer connectable to the LNA for receiving the amplified television signals and generating first intermediate frequency (IF1) quadrature signals, a complex mixer coupled to receive the IF1 quadrature signals and generate second intermediate frequency (IF2) quadrature signals, and a polyphase filter coupled to receive the IF2 quadrature signals and generate IF2 real signals. The system further includes a channel select filter (CSF) coupled to receive the IF2 real signals and select signals within a desired channel and an IF variable-gain amplifier (VGA) for amplifying the signals within the desired channel selected by the CSF.

Consistent with the present invention, there is still provided a television tuner system that includes a low noise amplifier (LNA) for receiving and amplifying television signals, a quadrature mixer coupled to receive the amplified television signals and generate first intermediate frequency (IF1) quadrature signals, a complex mixer coupled to receive the IF1 quadrature signals and generate second intermediate frequency (IF2) quadrature signals, a complex filter coupled to receive the IF2 quadrature signals, select signals within a desired channel, and generates IF2 real signals of the selected channel, and an IF variable-gain amplifier (VGA) for amplifying the IF2 real signals of the selected channel.

Also consistent with the present invention, there is provided a single-chip tuner suitable for use in a television system that includes a quadrature mixer connectable to a low-noise amplifier (LNA) for receiving television signals and connectable to a first local oscillator to receive first quadrature local oscillation (LO) signals, wherein the quadrature mixer generates first intermediate frequency (IF1) quadrature signals by mixing the television signals with the first quadrature LO signals, a dual quadrature mixer coupled to receive the IF1 quadrature signals and generate second intermediate frequency (IF2) quadrature signals, and a complex filter coupled to receive the IF2 quadrature signals and select signals within a desired channel.

Still consistent with the present invention, there is also provided a television tuner system that includes a low noise amplifier (LNA) for receiving and amplifying television signals, a first local oscillator for providing first quadrature local oscillation (LO) signals, a second local oscillator for providing second quadrature LO signals, and an integrated circuit (IC) provided on a substrate. The IC includes a quadrature mixer connectable to the LNA for receiving the amplified television signals and connectable to the first local oscillator to receive the first quadrature LO signals, wherein the quadrature mixer generates first intermediate frequency (IF1) quadrature signals by mixing the amplified television signals with the first quadrature LO signals, a dual quadrature mixer coupled to the quadrature mixer to receive the IF1 quadrature signals and connectable to the second local oscillator to receive the second quadrature LO signals, wherein the complex mixer generates second intermediate frequency (IF2) quadrature signals by mixing the IF1 quadrature signals with the second quadrature LO signals, and a complex filter coupled to receive the IF2 quadrature signals and select signals within a desired channel. The system further includes an IF variable-gain amplifier (VGA) for amplifying the signals within the desired channel selected by the complex filter.

Further consistent with the present invention, there is also provided a television tuner system that includes a low noise amplifier (LNA) for receiving and amplifying television signals, a first local oscillator for providing first quadrature local oscillation (LO) signals, a second local oscillator for providing second quadrature LO signals, a quadrature mixer coupled to receive the amplified television signals and the first quadrature LO signals and generate first intermediate frequency (IF1) quadrature signals, a complex mixer coupled to receive the IF1 quadrature signals and the second quadrature LO signals and generate second intermediate frequency (IF2) quadrature signals, and a variable-gain complex filter (VGCF) coupled to receive the IF2 quadrature signals, select signals within a desired channel, and amplify the selected signals.

Still further consistent with the present invention, there is provided a single-chip tuner suitable for use in a television system that includes a quadrature mixer connectable to a low-noise amplifier (LNA) for receiving television signals and connectable to a first local oscillator to receive first quadrature local oscillation (LO) signals, wherein the quadrature mixer generates first intermediate frequency (IF1) quadrature signals by mixing the television signals with the first quadrature LO signals, a dual quadrature mixer coupled to receive the IF1 quadrature signals and connectable to a second local oscillator to receive second quadrature LO signals, wherein the dual quadrature mixer generates second intermediate frequency (IF2) quadrature signals by mixing the IF1 quadrature signals with the second quadrature LO signals, and a variable-gain complex filter (VGCF) coupled to receive the IF2 quadrature signals, select signals within a desired channel, and amplify the selected signals.

Consistent with the present invention, there is further provided a television tuner system that includes a low noise amplifier (LNA) for receiving and amplifying television signals, a first local oscillator for providing first quadrature local oscillation (LO) signals including an in-phase signal and a quadrature signal, a second local oscillator for providing second quadrature LO signals including an in-phase signal and a quadrature signal, and an integrated circuit (IC) provided on a substrate. The IC includes a quadrature mixer connectable to the LNA for receiving the amplified television signals and connectable to the first local oscillator to receive the first quadrature LO signals, wherein the quadrature mixer generates first intermediate frequency (IF1) quadrature signals by mixing the amplified television signals with the in-phase signal and the quadrature signal of the first quadrature LO signals, a dual quadrature mixer coupled to the quadrature mixer to receive the IF1 quadrature signals and connectable to the second local oscillator to receive the second quadrature LO signals, wherein the complex mixer generates second intermediate frequency (IF2) quadrature signals by mixing the IF1 quadrature signals with the in-phase signal and the quadrature signal of the second quadrature LO signals, and a variable-gain complex filter (VGCF) coupled to receive the IF2 quadrature signals, select signals within a desired channel, and amplify the selected signals.

Consistent with the present invention, there is provided a television tuner system that includes a low noise amplifier (LNA) for receiving and amplifying television signals, a local oscillator for providing quadrature local oscillation (LO) signals, a quadrature generator coupled to the LNA to receive the amplified television signals and generate quadrature radio frequency (RF) signals, a complex mixer coupled to the LNA to receive the quadrature RF signals and coupled to the local oscillator to receive the quadrature LO signals, wherein the complex mixer generates quadrature intermediate frequency (IF) signals by mixing the quadrature RF signals with the quadrature LO signals, and a variable-gain complex filter (VGCF) coupled to receive the quadrature IF signals, select signals within a desired channel, and amplify the selected signals.

Further consistent with the present invention, there is provided a single-chip tuner suitable for use in a television system that includes a quadrature generator connectable to a low-noise amplifier (LNA) for receiving television signals and generating quadrature radio frequency (RF) signals, a dual quadrature mixer coupled to receive the quadrature RF signals and connectable to a local oscillator for receiving quadrature local oscillation (LO) signals, wherein the dual quadrature mixer generates quadrature intermediate frequency (IF) signals by mixing the quadrature RF signals with the quadrature LO signals, and a variable-gain complex filter (VGCF) coupled to receive the quadrature IF signals, select signals within a desired channel, and amplify the selected signals.

Still further consistent with the present invention, there is provided a tuning method suitable for use in a television system that includes receiving television signals, amplifying the television signals, providing first quadrature local oscillation (LO) signals, generating first intermediate frequency (IF1) quadrature signals by mixing the amplified television signals with the first quadrature LO signals, providing second quadrature LO signals, generating second intermediate frequency (IF2) quadrature signals by mixing the IF1 quadrature signals and the second quadrature LO signals, generating IF2 real signals using the IF2 quadrature signals, and selecting signals within a desired channel by filtering the IF2 real signals with a channel select filter (CSF).

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

In the drawings.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

In accordance with the present invention, there is provided a novel tuner structure suitable for integration. Embodiments of the present invention are discussed below with reference to FIGS. 3A-3E, 4A-4B, and 5-8.

Figure 3A:
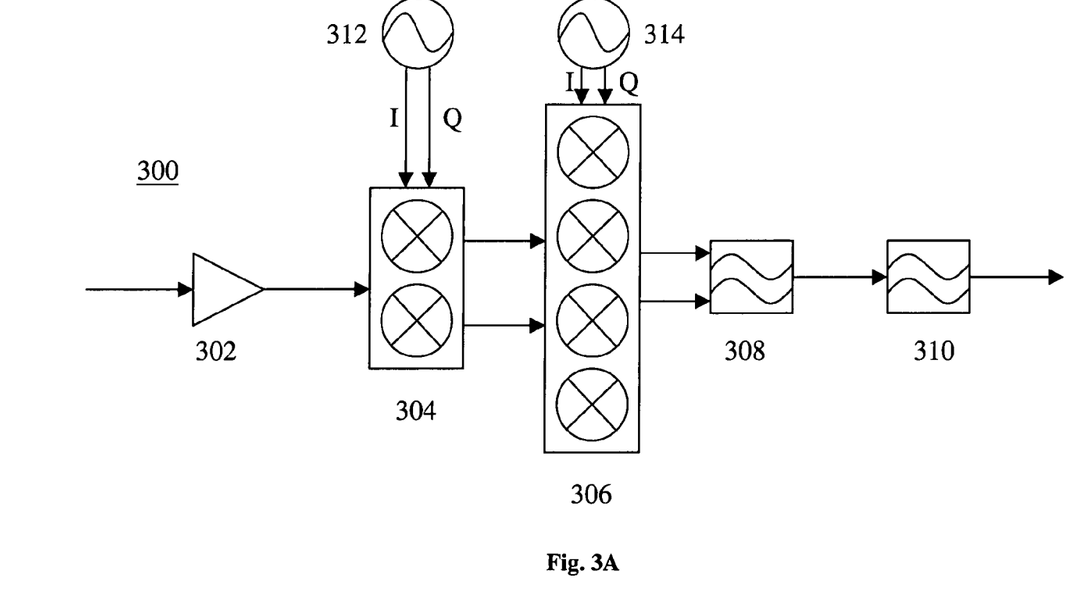
FIG. 3A shows a tuner consistent with an embodiment of the present invention.
Figure 3B:
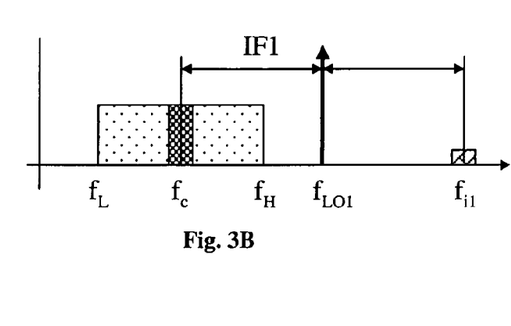
FIGS. 3B-3E illustrate frequency spectrums of television signals at different stages of the tuner of FIG. 3A.

FIG. 3A shows a tuner 300 consistent with an embodiment of the present invention. In FIG. 3A, tuner 300 includes a low-noise amplifier (LNA) 302, a quadrature generator 304, a complex mixer 306, a polyphase filter 308, and a channel select filter (CSF) 310. LNA 302 receives and amplifies television signals, or radio frequency (RF) signals, from which a desired channel is to be selected and signals within the desired channel are to be extracted. The received and amplified television signals have a frequency spectrum ranging from a low frequency $f_L$ to a high frequency $f_H$, as shown in FIG. 3B. FIG. 3B also indicates a center frequency $f_c$ of the desired channel.

Figure 3C:
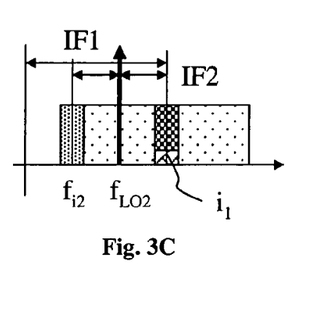

Quadrature generator 304 is coupled to LNA 302 to receive the amplified television signals and is connectable to a first local oscillator 312 to receive first quadrature local oscillation (LO) signals including an in-phase LO signal and a quadrature LO signal. In one aspect, the first quadrature LO signals have a frequency of $f_{LO1}$ that is higher than $f_c$ by an amount equal to a first intermediate frequency IF1. In another aspect, $f_{LO1}$ is higher than $f_H$. Thus, a first image signal band, or a first image signal, corresponding to the desired channel with respect to the first quadrature LO signals also falls outside the frequency spectrum of the received television signals and may be substantially suppressed by a filter (not shown) prior to LNA 302. FIG. 3B shows remnants of the first image signal having a center frequency $f_{i1}$ after being suppressed by the filter prior to LNA 302. Quadrature generator 304 may comprise a quadrature mixer, which mixes the television signals with both the in-phase signal and the quadrature signal of the first LO signals and generates signals referred to herein as IF1 quadrature signals which also include in-phase signals and quadrature signals. The signals are called IF1 quadrature signals because the desired channel therein has been converted to IF1. FIG. 3C shows a spectrum of the generated IF1 quadrature signals. As shown in FIG. 3C, the desired channel has been converted to first intermediate frequency IF1. In other words, signals of the desired channel in the received television signals have now been transferred to a frequency band with a center frequency equal to IF1. At the same time, the remnant first image signal are also converted to frequency IF1 because the difference between $f_{i1}$ and $f_{LO1}$ is equal to IF1, and a portion of the spectrum in FIG. 3C denoted as $i_1$ corresponds to the remnants of the first image signal.

For general convenience of illustration, names used in this description such as first intermediate frequency quadrature signals, second intermediate frequency real signals, etc., indicate that the desired channel in the corresponding signals is at the corresponding intermediate frequency. Thus, in the second intermediate frequency quadrature signals, the desired channel is at the second intermediate frequency.

IF1 quadrature signals are sent to complex mixer 306, which is connectable to a second local oscillator 314 for receiving second quadrature local oscillation (LO) signals including an in-phase LO signal and a quadrature LO signal. In one aspect, the second quadrature LO signals have a frequency of $f_{LO2}$ that is spaced apart from the first intermediate frequency IF1, to which the desired channel has been converted by quadrature generator 304, by an amount equal to a second intermediate frequency IF2, which is the standard IF, as shown in FIG. 3C. A second image signal band, or a second image signal, corresponding to the desired channel with respect to the first quadrature LO signals are also shown in FIG. 3C. The second image signal band has a center frequency $f_{i2}$. Complex mixer 306 may comprise a dual quadrature mixer, which mixes each of the in-phase and quadrature signals of the IF1 quadrature signals with each of the in-phase and quadrature signals of the second quadrature LO signals, and generates IF2 quadrature signals. The IF2 quadrature signals also include in-phase signals and quadrature signals.

Figure 3D:
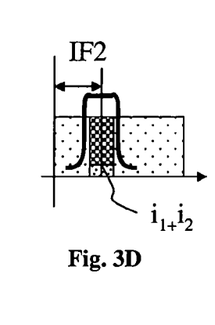

Polyphase filter 308 then combines the in-phase signals and the quadrature signals of the IF2 quadrature signals and cancels out the second image signal, generating IF2 real signals. Particularly, in the example shown in FIGS. 3A-3E, $f_{LO2}$ is lower than IF1, to which the desired channel has been converted, and the portion of the spectrum above $f_{LO2}$ needs to be preserved. Accordingly, by combining the in-phase and quadrature signals of the IF2 quadrature signals, polyphase filter 308 cancels out the portion of the spectrum in FIG. 3C that is lower than $f_{LO2}$, including the second image signal of the desired channel. FIG. 3D shows a spectrum of the IF2 real signals. As shown in FIG. 3D, the desired channel has been converted to second intermediate frequency IF2, and a portion of the spectrum in FIG. 3D denoted as $i_1+i_2$ corresponds to the remnants of the first image signal and the second image signal.

Figure 3E:
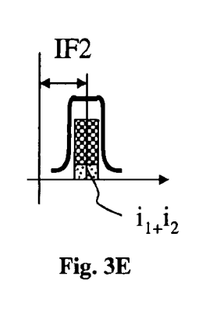

Finally, CSF 310 having a pass band with a center frequency of IF2 is used to filter out unwanted signals and select the signals within the desired channel in the received television signal, which have been converted to frequency IF2 by complex mixer 306 and polyphase filter 308. FIG. 3E shows a frequency spectrum of the signal output of CSF 310.

Figure 4A:
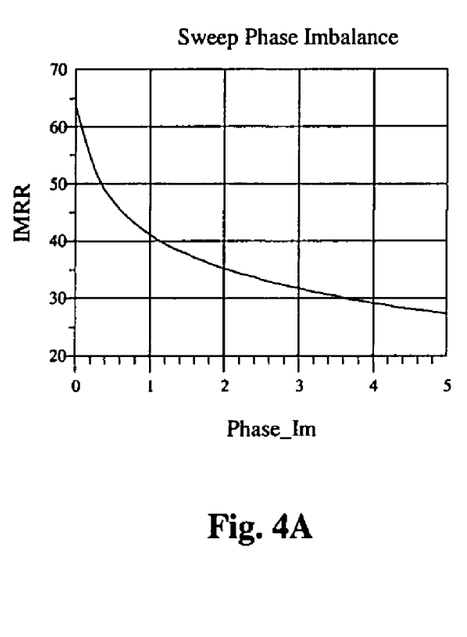
FIGS. 4A-4B illustrate a comparison of an image rejection ratio (IMRR) between the tuner of FIG. 3A and a conventional tuner.
Figure 4B:
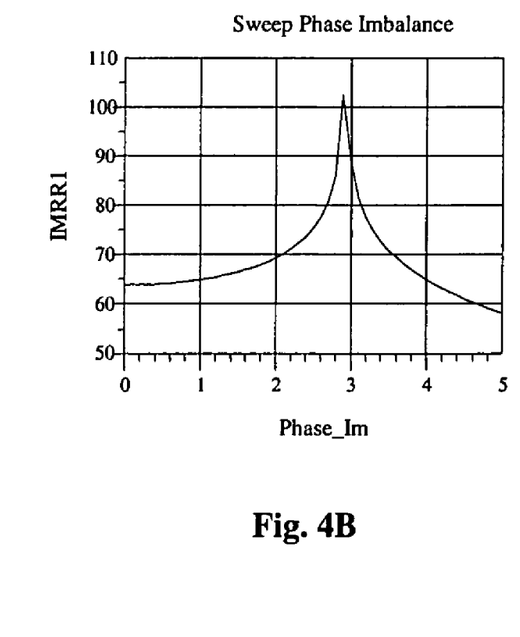

In tuner 300, a combination of dual-quadrature complex mixer 306 with polyphase filter 308 acts as an image rejection mixer (IRM). The IRM consistent with the present invention provides for a better image rejection ratio (IMRR) as compared to conventional tuners using only a quadrature generator but not a dual quadrature mixer. FIG. 4 and Tables 1-2 below show simulation results corresponding to operations of tuner 300.

In FIGS. 4A-4B, the abscissa represents a phase imbalance between the in-phase and quadrature signals and the ordinate represents the IMRR. Theoretically, the in-phase and quadrature signals should have a phase difference of 90°. The phase imbalance between the in-phase and quadrature signals is defined as a deviation of that phase difference from 90°. FIG. 4A shows the IMRR relative to the phase imbalance for a conventional tuner that uses only a quadrature mixer but not a dual quadrature mixer. FIG. 4B shows the IMRR of tuner 300 consistent with the present invention. As shown in FIG. 4A, the conventional tuner provides an IMRR of slightly over 60 dB when the in-phase and quadrature signals are exactly orthogonal to each other. The IMRR of the conventional tuner decreases to about 30 dB as the phase imbalance increases and lower than 30 dB when the phase imbalance is approximately 4° or more. In contrast, tuner 300 provides an IMRR of above 60 dB for a phase imbalance over a wide range of 1°~4°, and reaches over 100 dB when the phase imbalance is around 3°.

In this simulation, calculations of IMRR are performed and repeated 13 times for each of the conventional tuner and tuner 300 consistent with the present invention. The calculation results are shown in Tables 1 and 2 below. The first column of each of Tables 1 and 2 indicates the repeated calculations. In Table 1, the second column shows the phase imbalance between the in-phase signal and quadrature signal of the signal output of the quadrature generator of the conventional tuner. The third column of Table 1 shows the number of devices that satisfy a requirement that the IMRR be no less than 35 dB. The fourth column of Table 1 shows the number of devices that fail that requirement. In Table 2, the second column shows the phase imbalance between the in-phase signal and the quadrature signal of the signal output of quadrature generator 304. The third column of Table 2 shows the phase imbalance between the in-phase and the quadrature signals of the second quadrature LO signals. The fourth column of Table 2 shows the number of devices that satisfy a requirement that the IMRR be no less than 60 dB. The fifth column of Table 2 shows the number of devices that fail that requirement. As shown in Table 1, with the assumption of a minimum IMRR of 35 dB, the conventional tuner gives a simulated yield of about 49.6%. In contrast, even assuming a minimum IMRR of 60 dB, a simulated yield of tuner 300 consistent with the present invention is 99.4%, as shown in Table 2.

TABLE 1

| Calculation | Phase imbalance | Pass | Fail |
|---|---|---|---|
| 0 | 0.000 | 496.000 | 504.000 |
| 1 | −0.828 | | |
| 2 | 3.645 | | |
| 3 | 2.455 | | |
| 4 | −1.324 | | |
| 5 | −0.872 | | |
| 6 | −0.317 | | |
| 7 | 2.842 | | |
| 8 | 5.263 | | |
| 9 | 5.390 | | |
| 10 | −2.211 | | |
| 11 | 1.706 | | |
| 12 | −2.215 | | |
| 13 | 0.405 | | |

TABLE 2

| Calculation | Signal Phase imbalance | LO Phase imbalance | Pass | Fail |
|---|---|---|---|---|
| 0 | 0.000 | 0.000 | 994.000 | 6.000 |
| 1 | 0.696 | −3.113 | | |
| 2 | 0.898 | 3.277 | | |
| 3 | 1.835 | 2.739 | | |
| 4 | 1.373 | −4.111 | | |
| 5 | −1.424 | −1.130 | | |
| 6 | 0.480 | 4.320 | | |
| 7 | −0.659 | −0.603 | | |
| 8 | 2.518 | −.967 | | |
| 9 | 0.004 | 1.670 | | |
| 10 | 1.452 | −2.913 | | |
| 11 | 0.740 | 0.325 | | |
| 12 | 3.455 | 1.201 | | |
| 13 | 3.020 | 6.606 | | |

Figure 5:
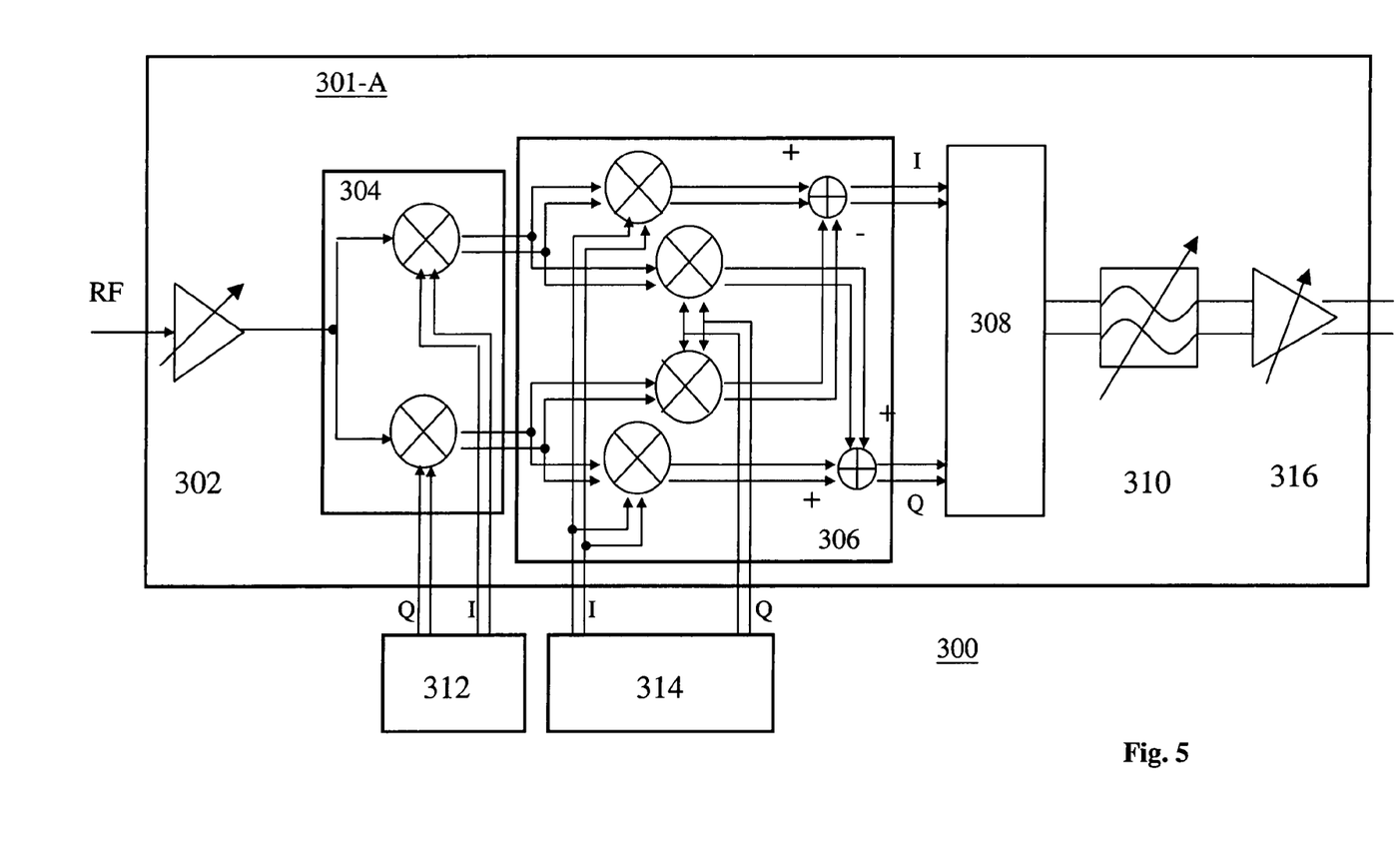
FIG. 5 shows a structure of a tuner consistent with an embodiment of the present invention.

Tuner 300 is suitable for a high degree of integration. For example, as shown in FIG. 5 and consistent with one embodiment of the present invention, all of quadrature generator 304, dual quadrature mixer 306, and polyphase filter 308 may be integrated into a single chip 301-A formed on a substrate such as a semiconductor substrate. FIG. 5 also shows certain details of the circuit components, such as signal inputs to and outputs from dual quadrature mixer 306. Such details should now be understandable by one skilled in the art and are not discussed further. FIG. 5 further shows that tuner 300 is connectable to an IF variable-gain amplifier (VGA) 316 for amplifying the selected channel signals. In one aspect, LNA 302, CSF 310, and VGA 316 are also integrated into chip 301-A, as shown in FIG. 5.

Figure 6:
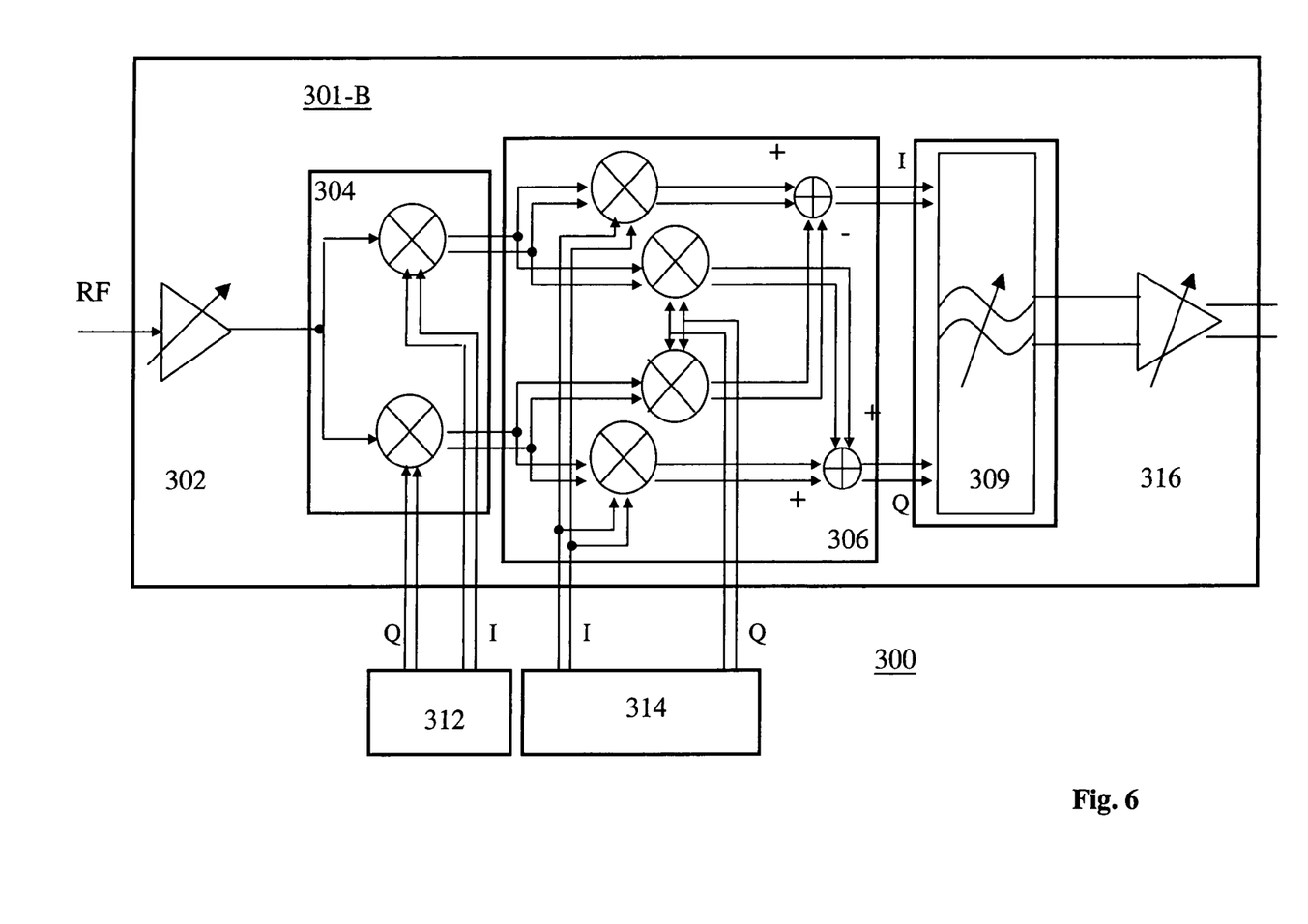
FIG. 6 shows a structure of a tuner consistent with another embodiment of the present invention.

Also, as shown in FIG. 6 and consistent with another embodiment of the present invention, polyphase filter 308 and CSF 310 may be replaced with a complex filter 309, which may be integrated into chip 301-B, together with quadrature generator 304 and dual quadrature mixer 306. Complex filter 309 receives the IF2 quadrature signals from dual quadrature mixer 306, selects signals within a desired channel, and generates IF2 real signals of the selected channel. FIG. 6 also shows that tuner 300 is connectable to an IF VGA 316 for amplifying the IF2 real signals of the selected channel. In one aspect, LNA 302 and VGA 316 are also integrated into chip 301-B, as shown in FIG. 6.

Figure 7:
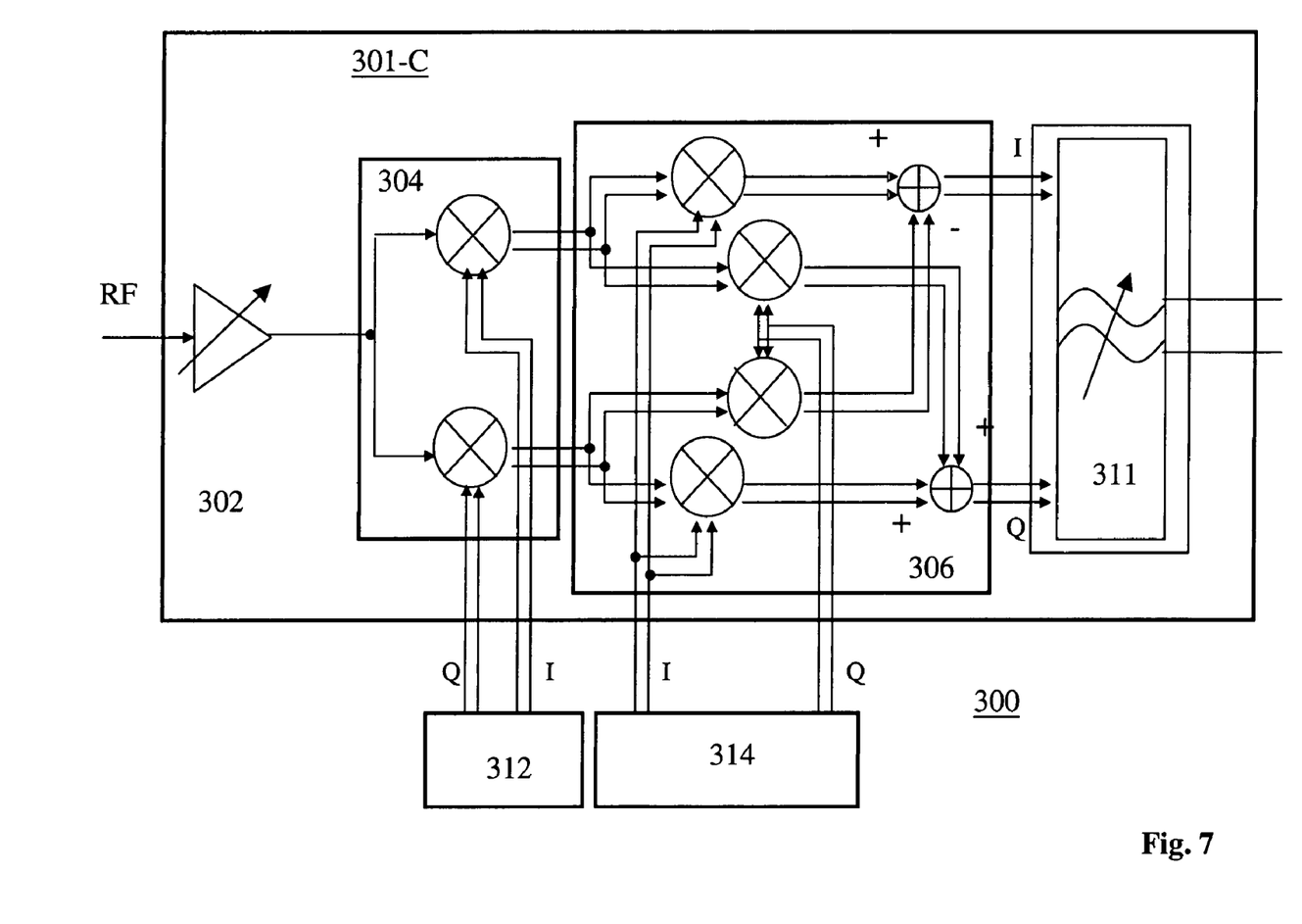
FIG. 7 shows a structure of a tuner consistent with another embodiment of the present invention.

Further, as shown in FIG. 7 and consistent with yet another embodiment of the present invention, complex filter 309 and IF VGA 316 of FIG. 6 may be combined into a single circuit component acting as a variable-gain complex filter (VGCF) 311, which may then be integrated into chip 301-C, together with quadrature generator 304 and dual quadrature mixer 306. VGCF 311 receives the IF2 quadrature signals from dual quadrature mixer 306, selects signals within a desired channel, converts the selected signals to the standard IF, and amplifies the selected channel signals. In one aspect, LNA 302 may also be integrated into chip 301-C, as shown in FIG. 7.

Figure 8:
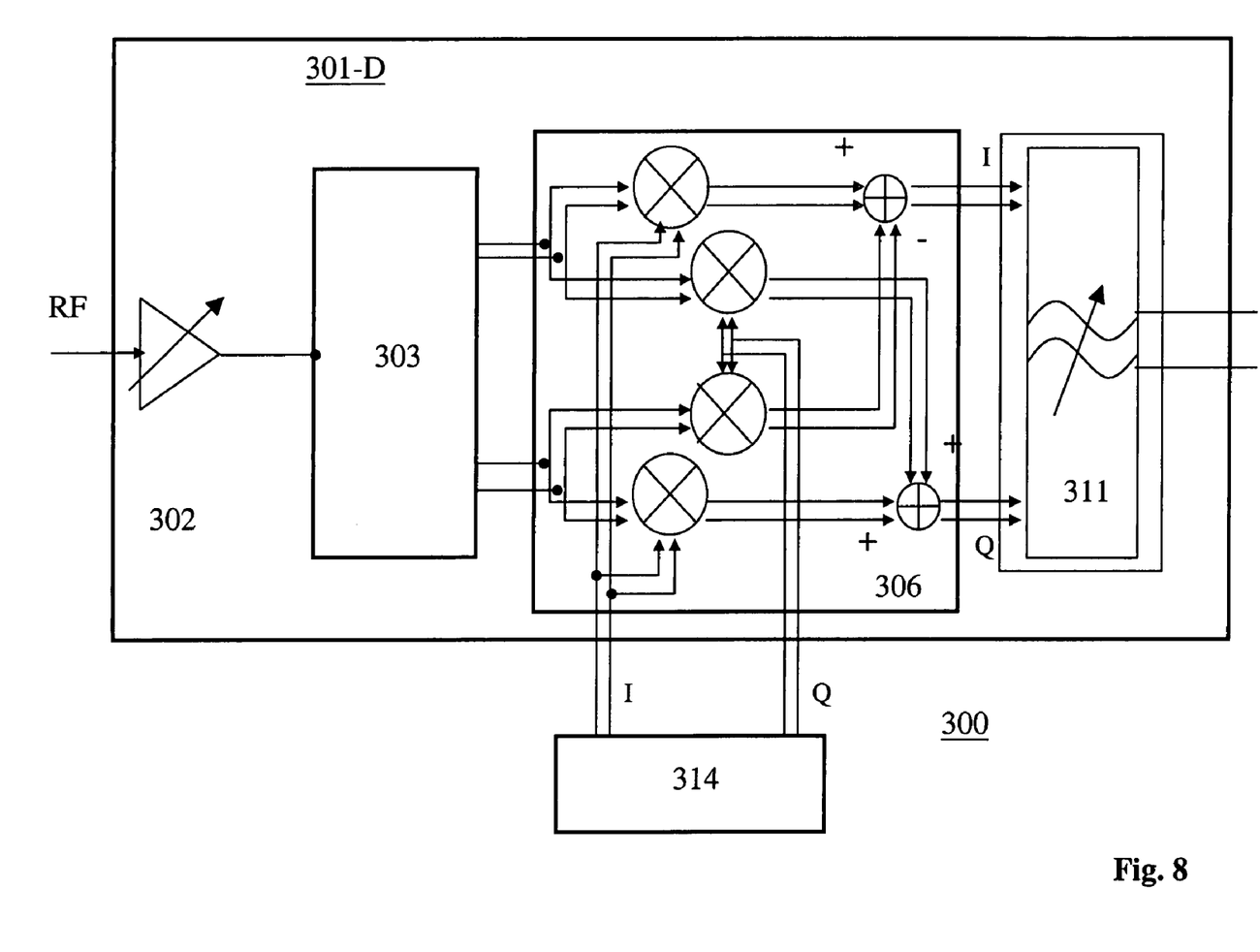
FIG. 8 shows a structure of a tuner consistent with another embodiment of the present invention.

As shown in FIG. 8 and consistent with still another embodiment of the present invention, quadrature mixer 304 may be replaced with a quadrature generator 303, which receives the amplified television signals from LNA 302 and generates quadrature RF signals. The quadrature RF signals are sent to dual quadrature mixer 306, which mixes the quadrature RF signals with second quadrature LO signals provided by second local oscillator 314 and outputs quadrature IF signals. Quadrature generator 303 may be integrated into chip 301-D, together with dual quadrature mixer 306 and VGCF 311. In one aspect, LNA 302 may also be integrated into chip 301-D, as shown in FIG. 8. The circuit shown in FIG. 8 should now be understandable by one skilled in the art and is not explained in further detail herein.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A television tuner system, comprising:
   a low noise amplifier (LNA) for receiving and amplifying television signals;
   an up-conversion quadrature mixer coupled to receive the amplified television signals and generate first intermediate frequency (IF1) quadrature signals;
   a complex mixer coupled to receive the IF1 quadrature signals and generate second intermediate frequency (IF2) quadrature signals;
   a polyphase filter coupled to receive the IF2 quadrature signals and generate IF2 real signals;
   a channel select filter (CSF) coupled to receive the IF2 real signals and select signals within a desired channel;
   an IF variable-gain amplifier (VGA) for amplifying the signals within the desired channel selected by the CSF; and
   a first local oscillator for providing first quadrature local oscillation (LO) signals,
   wherein:
      the up-conversion quadrature mixer is connectable to the first local oscillator for receiving the first quadrature LO signals and for mixing the amplified television signals with the first quadrature LO signals to generate the IF1 quadrature signals; and
      the first intermediate frequency IF1 is higher than a frequency of the television signals.

2. The system of claim 1, wherein a frequency of the first quadrature LO signals is outside a frequency spectrum of the television signals and higher than a center frequency of the desired channel by an amount equal to the first intermediate frequency IF1.

3. The system of claim 1, further comprising a second local oscillator for providing second quadrature local oscillation (LO) signals, wherein the complex mixer is connectable to the second local oscillator for receiving the second quadrature LO signals and mixing the IF1 quadrature signals with the second quadrature LO signals to generate the IF2 quadrature signals.

4. The system of claim 3, wherein a frequency of the second quadrature LO signals is lower than the first intermediate frequency IF1 by an amount equal to the second intermediate frequency IF2.

5. The system of claim 4, wherein the CSF has a pass band with a center frequency approximately equal to the second intermediate frequency IF2.

6. The system of claim 1, further comprising a second local oscillator for providing quadrature local oscillation (LO) signals, wherein the complex mixer is connectable to the second local oscillator for receiving the quadrature LO signals and mixing the IF1 quadrature signals with the quadrature LO signals to generate the IF2 quadrature signals.

7. The system of claim 1, wherein the complex mixer comprises a dual quadrature mixer.

8. A single-chip tuner suitable for use in a television system, comprising:
   an up-conversion quadrature mixer connectable to a low-noise amplifier (LNA) for receiving television signals and connectable to a first local oscillator to receive first quadrature local oscillation (LO) signals, wherein the up-conversion quadrature mixer generates first intermediate frequency (IF1) quadrature signals by mixing the television signals with the first quadrature LO signals;
   a dual quadrature mixer coupled to receive the IF1 quadrature signals and generate second intermediate frequency (IF2) quadrature signals;
   a polyphase filter coupled to receive the IF2 quadrature signals and generate IF2 real signals; and
   a channel select filter (CSF) coupled to receive the IF2 real signals and select a desired band of signals,
   wherein the first intermediate frequency IF1 is higher than a frequency of the television signals.

9. The tuner of claim 8, wherein a frequency of the first quadrature LO signals is outside a frequency spectrum of the television signals and higher than a center frequency of the desired channel by an amount equal to the first intermediate frequency IF1.

10. The tuner of claim 8, wherein the dual quadrature mixer is connectable to a second local oscillator for receiving second quadrature LO signals, and wherein the dual quadrature mixer generate the IF2 quadrature signals by mixing the IF1 quadrature signals with the second quadrature LO signals.

11. The tuner of claim 10, wherein a frequency of the second quadrature LO signals is lower than the first intermediate frequency IF1 by an amount equal to the second intermediate frequency IF2.

12. The tuner of claim 8, wherein the CSF has a pass band with a center frequency approximately equal to the second intermediate frequency IF2.

13. The tuner of claim 8, further comprising an IF variable-gain amplifier coupled for amplifying the selected band of signals.

14. The tuner of claim 8, wherein the LNA is integrated into the tuner.

15. The tuner of claim 8, further comprising an IF variable-gain amplifier coupled for amplifying the selected band of signals, wherein the LNA is also integrated into the tuner.

16. A television tuner system, comprising:
   a low noise amplifier (LNA) for receiving and amplifying television signals;
   an integrated circuit provided on a substrate, including
      an up-conversion quadrature mixer connectable to the LNA for receiving the amplified television signals and generating first intermediate frequency (IF1) quadrature signals,
      a complex mixer coupled to receive the IF1 quadrature signals and generate second intermediate frequency (IF2) quadrature signals, and
      a polyphase filter coupled to receive the IF2 quadrature signals and generate IF2 real signals;
   a channel select filter (CSF) coupled to receive the IF2 real signals and select signals within a desired channel;
   an IF variable-gain amplifier (VGA) for amplifying the signals within the desired channel selected by the CSF; and
   a first local oscillator for providing first quadrature local oscillation (LO) signals,
   wherein:
      the up-conversion quadrature mixer is connectable to the first local oscillator to receive the first quadrature LO signals and to mix the amplified television signals with the first quadrature LO signals to generate the IF1 quadrature signals; and the first intermediate frequency IF1 is higher than a frequency of the television signals.

17. The system of claim 16, wherein a frequency of the first quadrature LO signals is outside a frequency spectrum of the television signals and higher than a center frequency of the desired channel by an amount equal to the first intermediate frequency IF1.

18. The system of claim 17, further comprising a second local oscillator for providing second quadrature local oscillation (LO) signals, wherein the complex mixer is connectable to the second local oscillator to receive the second quadrature LO signals and to mix the IF1 quadrature signals with the second quadrature LO signals to generate the IF2 quadrature signals.

19. The system of claim 18, wherein a frequency of the second quadrature LO signals is lower than the first intermediate frequency IF1 by an amount equal to the second intermediate frequency IF2.

20. The system of claim 19, wherein the CSF has a pass band with a center frequency approximately equal to the second intermediate frequency IF2.

21. The system of claim 16, wherein the complex mixer comprises a dual quadrature mixer.

22. A television tuner system, comprising:
a low noise amplifier (LNA) for receiving and amplifying television signals;
an up-conversion quadrature mixer coupled to receive the amplified television signals and generate first intermediate frequency (IF1) quadrature signals;
a complex mixer coupled to receive the IF1 quadrature signals and generate second intermediate frequency (IF2) quadrature signals;
a complex filter coupled to receive the IF2 quadrature signals, generate IF2 real signals, and then select signals within a desired channel;
an IF variable-gain amplifier (VGA) for amplifying the selected signals; and
a first local oscillator for providing first quadrature local oscillation (LO) signals,
wherein:
the up-conversion quadrature mixer is connectable to the first local oscillator to receive the first quadrature LO signals and to mix the amplified television signals with the first quadrature LO signals to generate the IF1 quadrature signals; and
the first intermediate frequency IF1 is higher than a frequency of the television signals.

23. The system of claim 22, wherein a frequency of the first quadrature LO signals is outside a frequency spectrum of the television signals and higher than a center frequency of the desired channel by an amount equal to the first intermediate frequency IF1.

24. The system of claim 23, further comprising a second local oscillator for providing second quadrature local oscillation (LO) signals, wherein the complex mixer is connectable to the second local oscillator to receive the second quadrature LO signals and to mix the IF1 quadrature signals with the second quadrature LO signals to generate the IF2 quadrature signals.

25. The system of claim 24, wherein a frequency of the second quadrature LO signals is lower than the first intermediate frequency IF1 by an amount equal to the second intermediate frequency IF2.

26. The system of claim 22, wherein the complex mixer comprises a dual quadrature mixer.

27. A single-chip tuner suitable for use in a television system, comprising:
an up-conversion quadrature mixer connectable to a low-noise amplifier (LNA) for receiving television signals and connectable to a first local oscillator to receive first quadrature local oscillation (LO) signals, wherein the up-conversion quadrature mixer generates first intermediate frequency (IF1) quadrature signals by mixing the television signals with the first quadrature LO signals;
a dual quadrature mixer coupled to receive the IF1 quadrature signals and generate second intermediate frequency (IF2) quadrature signals; and
a complex filter coupled to receive the IF2 quadrature signals, generate IF2 real signals, and then select signals within a desired channel,
wherein the first intermediate frequency IF1 is higher than a frequency of the television signals.

28. The tuner of claim 27, wherein a frequency of the first quadrature LO signals is outside a frequency spectrum of the television signals and higher than a center frequency of the desired channel by an amount equal to the first intermediate frequency IF1.

29. The tuner of claim 28, wherein the dual quadrature mixer is connectable to a second local oscillator to receive second quadrature LO signals, and wherein the dual quadrature mixer generates the IF2 quadrature signals by mixing the IF1 quadrature signals with the second quadrature LO signals.

30. The tuner of claim 29, wherein a frequency of the second quadrature LO signals is lower than the first intermediate frequency IF1 by an amount equal to the second intermediate frequency IF2.

31. The tuner of claim 27, further comprising an IF variable-gain amplifier coupled for amplifying the signals within the desired channel selected by the complex filter.

32. The tuner of claim 27, wherein the LNA is integrated into the tuner.

33. The tuner of claim 27, further comprising an IF variable-gain amplifier coupled for amplifying the signals within the desired channel selected by the complex filter, wherein the LNA is also integrated into the tuner.

34. A television tuner system, comprising:
a low noise amplifier (LNA) for receiving and amplifying television signals;
a first local oscillator for providing first quadrature local oscillation (LO) signals;
a second local oscillator for providing second quadrature LO signals;
an integrated circuit provided on a substrate, including
an up-conversion quadrature mixer connectable to the LNA for receiving the amplified television signals and connectable to the first local oscillator to receive the first quadrature LO signals, wherein the up-conversion quadrature mixer generates first intermediate frequency (IF1) quadrature signals by mixing the amplified television signals with the first quadrature LO signals,
a dual quadrature mixer coupled to the quadrature mixer to receive the IF1 quadrature signals and connectable to the second local oscillator to receive the second quadrature LO signals, wherein the complex mixer generates second intermediate frequency (IF2) quadrature signals by mixing the IF1 quadrature signals with the second quadrature LO signals, and
a complex filter coupled to receive the IF2 quadrature signals, generate IF2 real signals, and then select signals within a desired channel; and an IF variable-gain amplifier (VGA) for amplifying the signals within the desired channel selected by the complex filter,
wherein the first intermediate frequency IF1 is higher than a frequency of the television signals.

35. The system of claim 34, wherein a frequency of the first quadrature LO signals is outside a frequency spectrum of the television signals and higher than a center frequency of the desired channel by an amount equal to IF1.

36. The system of claim 35, wherein a frequency of the second quadrature LO signals is lower than the first intermediate frequency IF1.

37. A television tuner system, comprising:
a low noise amplifier (LNA) for receiving and amplifying television signals;
a first local oscillator for providing first quadrature local oscillation (LO) signals;
a second local oscillator for providing second quadrature LO signals;
an up-conversion quadrature mixer coupled to receive the amplified television signals and the first quadrature LO signals and generate first intermediate frequency (IF1) quadrature signals;
a complex mixer coupled to receive the IF1 quadrature signals and the second quadrature LO signals and generate second intermediate frequency (IF2) quadrature signals; and
a variable-gain complex filter (VGCF) coupled to receive the IF2 quadrature signals, generate IF2 real signals, and then select signals within a desired channel and amplify the selected signals,
wherein the first intermediate frequency IF1 is higher than a frequency of the television signals.

38. The system of claim 37, wherein the first quadrature LO signals include an in-phase signal and a quadrature signal, wherein the up-conversion quadrature mixer generates the IF1 quadrature signals by mixing the amplified television signals with the in-phase signal and the quadrature signal of the first quadrature LO signals.

39. The system of claim 37, wherein a frequency of the first quadrature LO signals is outside a frequency spectrum of the television signals and higher than a center frequency of the desired channel by an amount equal to the first intermediate frequency IF1.

40. The system of claim 37, wherein a frequency of the second quadrature LO signals is lower than the first intermediate frequency IF1 by an amount equal to the second intermediate frequency IF2.

41. The system of claim 37, wherein the second quadrature LO signals include an in-phase signal and a quadrature signal, wherein the complex mixer comprises a dual quadrature mixer for mixing the second quadrature LO signals and the IF1 quadrature signals to generate the IF2 quadrature signals.

42. A single-chip tuner suitable for use in a television system, comprising:
an up-conversion quadrature mixer connectable to a low-noise amplifier (LNA) for receiving television signals and connectable to a first local oscillator to receive first quadrature local oscillation (LO) signals, wherein the up-conversion quadrature mixer generates first intermediate frequency (IF1) quadrature signals by mixing the television signals with the first quadrature LO signals;
a dual quadrature mixer coupled to receive the IF1 quadrature signals and connectable to a second local oscillator to receive second quadrature LO signals, wherein the dual quadrature mixer generates second intermediate frequency (IF2) quadrature signals by mixing the IF1 quadrature signals with the second quadrature LO signals; and
a variable-gain complex filter (VGCF) coupled to receive the IF2 quadrature signals, generate IF2 real signals, and then select signals within a desired channel and amplify the selected signals,
wherein the first intermediate frequency IF1 is higher than a frequency of the television signals.

43. The tuner of claim 42, wherein a frequency of the first quadrature LO signals is outside a frequency spectrum of the television signals and higher than a center frequency of the desired channel by an amount equal to the first intermediate frequency IF1.

44. The tuner of claim 43, wherein a frequency of the second quadrature LO signals is lower than the first intermediate frequency IF1.

45. The tuner of claim 42, wherein the LNA is integrated into the tuner.

46. A television tuner system, comprising:
a low noise amplifier (LNA) for receiving and amplifying television signals;
a first local oscillator for providing first quadrature local oscillation (LO) signals including an in-phase signal and a quadrature signal;
a second local oscillator for providing second quadrature LO signals including an in-phase signal and a quadrature signal; and
an integrated circuit provided on a substrate, including
an up-conversion quadrature mixer connectable to the LNA for receiving the amplified television signals and connectable to the first local oscillator to receive the first quadrature LO signals, wherein the up-conversion quadrature mixer generates first intermediate frequency (IF1) quadrature signals by mixing the amplified television signals with the in-phase signal and the quadrature signal of the first quadrature LO signals,
a dual quadrature mixer coupled to the quadrature mixer to receive the IF1 quadrature signals and connectable to the second local oscillator to receive the second quadrature LO signals, wherein the complex mixer generates second intermediate frequency (IF2) quadrature signals by mixing the IF1 quadrature signals with the in-phase signal and the quadrature signal of the second quadrature LO signals, and
a variable-gain complex filter (VGCF) coupled to receive the IF2 quadrature signals, generate IF2 real signals, and then select signals within a desired channel and amplify the selected signals,
wherein the first intermediate frequency IF1 is higher than a frequency of the television signals.

47. The system of claim 46, wherein a frequency of the first quadrature LO signals is outside a frequency spectrum of the television signals and higher than a center frequency of the desired channel by an amount equal to the first intermediate frequency IF1, and wherein a frequency of the second quadrature LO signals is lower than the first intermediate frequency IF1.

48. A television tuner system, comprising:
a low noise amplifier (LNA) for receiving and amplifying television signals;
a local oscillator for providing quadrature local oscillation (LO) signals;
an up-conversion quadrature mixer coupled to the LNA to receive the amplified television signals and generate first intermediate frequency (IF1) quadrature signals;

a complex mixer coupled to receive the IF1 quadrature signals and coupled to the local oscillator to receive the quadrature LO signals, wherein the complex mixer generates second intermediate frequency (IF2) quadrature signals by mixing the IF1 quadrature signals with the quadrature LO signals; and a variable-gain complex filter (VGCF) coupled to receive the IF2 quadrature signals, generate IF2 real signals, and then select signals within a desired channel and amplify the selected signals, wherein the first intermediate frequency IF1 is higher than a frequency of the television signals.

49. The system of claim 48, wherein the up-conversion quadrature mixer, the complex mixer, and the VGCF are formed in a single chip.

50. The system of claim 48, wherein the LNA, the up-conversion quadrature mixer, the complex mixer, and the VGCF are formed in a single chip.

51. A single-chip tuner suitable for use in a television system, comprising:

an up-conversion quadrature mixer connectable to a low-noise amplifier (LNA) for receiving television signals and generating first intermediate frequency (IF1) quadrature signals;

a dual quadrature mixer coupled to receive the IF1 quadrature signals and connectable to a local oscillator for receiving quadrature local oscillation (LO) signals, wherein the dual quadrature mixer generates second intermediate frequency (IF2) quadrature signals by mixing the IF1 quadrature signals with the quadrature LO signals; and a variable-gain complex filter (VGCF) coupled to receive the IF2 quadrature signals, generate IF2 real signals, and then select signals within a desired channel and amplify the selected signals, wherein the first intermediate frequency IF1 is higher than a frequency of the television signals.

52. The tuner of claim 51, wherein the LNA is integrated into the tuner.

53. A tuning method for use in a television system, comprising:

receiving television signals;

amplifying the television signals;

providing first quadrature local oscillation (LO) signals;

generating first intermediate frequency (IF1) quadrature signals by mixing the amplified television signals with the first quadrature LO signals;

providing second quadrature LO signals;

generating second intermediate frequency (IF2) quadrature signals by mixing the IF1 quadrature signals and the second quadrature LO signals;

generating IF2 real signals using the IF2 quadrature signals; and selecting signals within a desired channel by filtering the IF2 real signals with a channel select filter (CSF), wherein the first intermediate frequency IF1 is higher than a frequency of the television signals.

* * * * *